Jan. 8, 1957 E. MANCZUR 2,776,486
DENTAL TRAY
Filed April 22, 1955 3 Sheets-Sheet 1
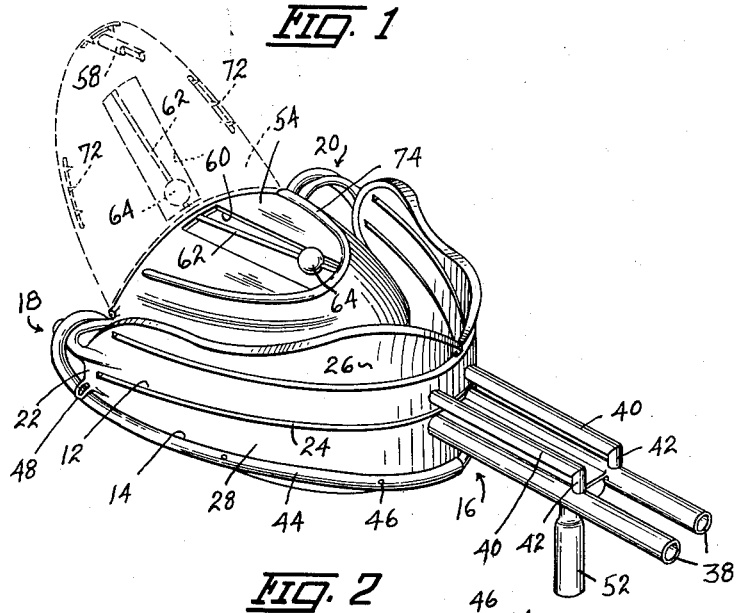
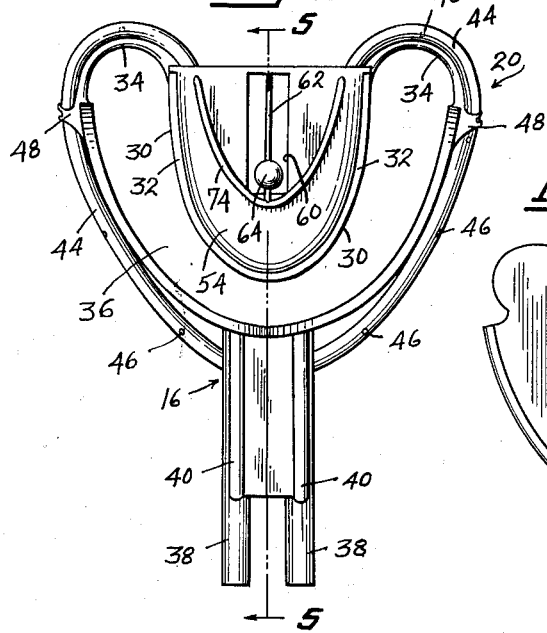
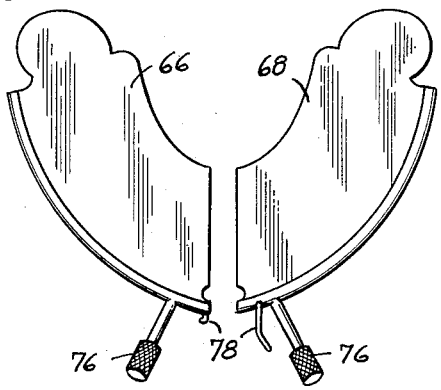
INVENTOR.
ELIAS MANCZUR
BY Talbert Dick & Adler
ATTORNEYS.

Jan. 8, 1957  E. MANCZUR  2,776,486
DENTAL TRAY
Filed April 22, 1955  3 Sheets-Sheet 2
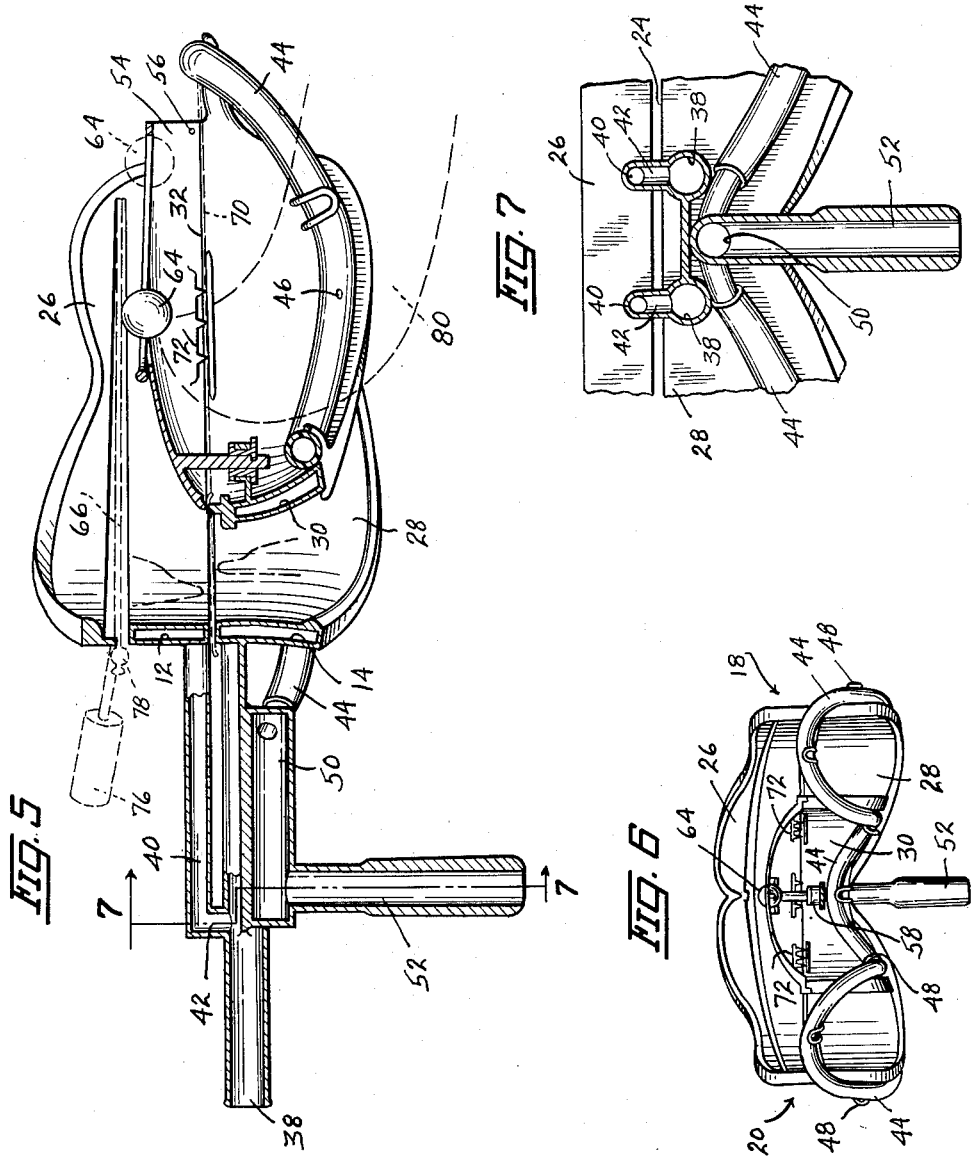
INVENTOR.
ELIAS MANCZUR
BY Talbert Dick & Adler
ATTORNEYS Jan. 8, 1957     E. MANCZUR     2,776,486
DENTAL TRAY
Filed April 22, 1955     3 Sheets-Sheet 3
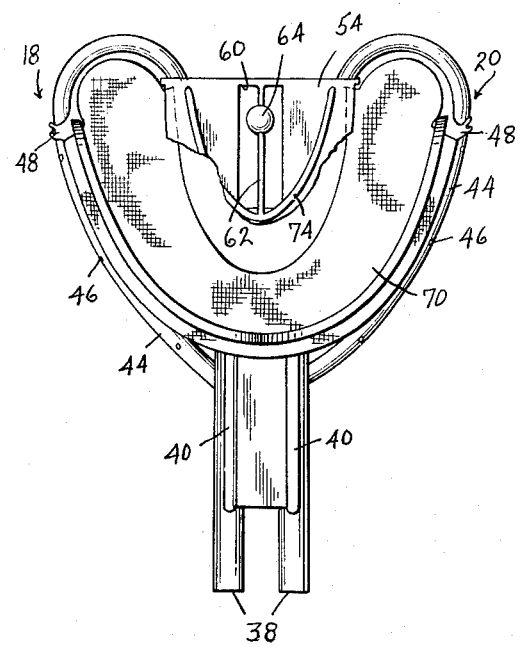
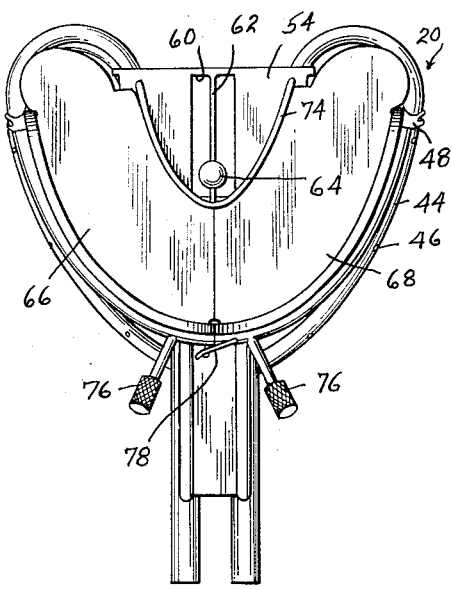
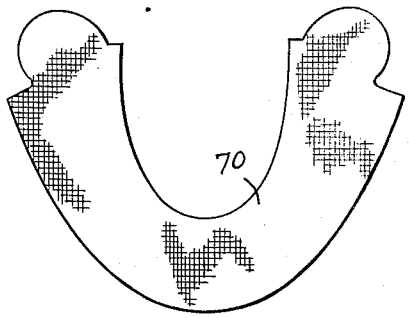
INVENTOR.
ELIAS MANCZUR
BY Talbert Dick & Adler
ATTORNEYS.

United States Patent Office 2,776,486
Patented Jan. 8, 1957

2,776,486
DENTAL TRAY
Elias Manczur, Des Moines, Iowa
Application April 22, 1955, Serial No. 503,158
15 Claims. (Cl. 32—19)

My invention relates to improvements in dental trays and more particularly to a dental impression tray for making simultaneous impressions of both the entire maxillary and mandibular arches for obtaining a true and accurate centric occlusion, or in other words to get an accurate impression of the normal registering contacting position of the upper and lower sets of teeth.

One of the important objects of this invention is to provide novel means for retaining and tempering impression material in two integrally formed sections.

Another object of my invention is the provision in a dental tray of novel tongue guide means that assures positioning the maxillary and mandibular arches in true centric occlusion while the impression is being made.

A still further object of this invention is to provide a dental impression tray of the above class that is equipped with a saliva ejector.

Other objects of this invention contemplate the provision of a dental impression tray that is simple to manipulate, economical in construction and extremely efficient for its intended purpose.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view showing a preferred embodiment of my new dental tray, Fig. 2 is a top view of this invention, Figs. 3 and 4 are top views of removable plates used with this new dental tray, Fig. 5 is an enlarged cross sectional view taken on the line 5—5 of Fig. 2, Fig. 6 is a rear view of this invention, Fig. 7 is a cross sectional view taken on the line 7—7 of Fig. 5, Fig. 8 is a top view similar to Fig. 2 but showing a foraminous layer in place, Fig. 9 is a top view similar to Fig. 8 but showing the plates of Figs. 3 and 4 in place, and Fig. 10 is a top view of a foraminous or reticulated layer used with this tray.

Referring to the drawings I provide a maxillary or upper section 12 and a mandibular or lower section 14. These sections are of a general U-shape and can be described more particularly as being designed and adapted to conform to the outline of the respective upper and lower dental arches. For purpose of reference the curved or closed end 16 of the sections 12 and 14 are designated as the front and the respective extremities 18 and 20 of the U as the rear portions of this tray. Sections 12 and 14 are arranged one above the other in corresponding position and are integrally joined at the respective rear ends 18 and 20 as indicated at 22. A narrow slot 24 (Fig. 1) separates sections 12 and 14 at all points except points 22. An upstanding buccal wall 26 is formed on upper section 12 and a downwardly extending buccal wall 28 is likewise formed on the lower section 14. A retaining wall 30 having the lip or ledge 32 of a general U shape and smaller than the U formed by sections 12 and 14 is arranged between sections 12 and 14 (Fig. 2) and within the U portion of such sections and is secured to the respective rear ends 18 and 20 by any suitable means here shown with the curved tubular portions 34. Thus formed, the space 36 is provided for taking impressions as will later appear.

Sections 12 and 14 and wall 30 are of hollow construction (Fig. 5) with such hollow areas interconnected through points 22 and members 32 to allow the passage of water therethrough which is received and expelled at the front 16. For this purpose a pair of parallel tubes or pipes extend from front 16 in communication with the hollow portion of section 14 and a second pair of parallel pipes 40 similarly extend from front 16 in communication with the hollow portion of section 12. The outer ends of pipes 40 are joined with the respective pipes 38 as at 42 (Figs. 1 and 7). In this way a source of water supply under ordinary main pressure can be applied to either of pipes 38 which will circulate through both sections 12 and 14 and wall 30 and the other pipe 38 serves as an outlet which can be connected by a tube or the like for drainage. A saliva ejector consisting of a plastic tube 44 or the like provided with spaced apertures 46 extends from the front 16 around the outer side of section 16 and follows the U contour along wall 30 (Fig. 6). Suitable hooks 48 at ends 18 and 20 and on wall 30 are provided to releasably hold tube 44 in place. At the front 16, tube 44 connects to a conduit 50 underlying pipes 38 and conduit 50 communicates with a pipe, tube or conduit 52 which is designed for attachment to a source of suction in a well known manner. Tube 44 is made to be easily removed for sterilizing. To the top of wall 30, and conforming to the shape thereof is an arched lingual wall 54 hingedly secured at the open ends of wall 30 by a pin or hinge 56 (Fig. 5). Wall 54 is designed to swing upwardly as shown in broken lines in Fig. 1 and is provided with a lock means 58 (Fig. 6) at the forward or closed U portion of wall 32 when in closed position. The top of wall 54 is formed with a slot 60 from front to rear and a slide rod 62 extending longitudinally of such slot carries a tongue guide member 64 preferably in the form of a bead or ball which is slidable thereon. A pair of complementary plates 66 and 68 (Figs. 3 and 4) which together duplicate the shape of space 36 and a foraminous or reticulated layer 70 (Fig. 10) are used between sections 12 and 14 in the functioning of this tray which I shall now describe.

With this tray first positioned as shown in Fig. 1, the lingual wall 54 is unlocked and raised to its upward position represented by the broken lines. Layer 70 is fitted into space 36 so that it is supported by ledge 32 on wall 30 and extends into and possibly through slot 24 where it is supported by the top of section 14 that forms the lower limits of slot 24 as shown in Fig. 8. Wall 54 is then closed and locked to hold layer 70 to ledge 32 and teeth 72 depending from the underside of wall 70 (Figs. 1 and 5), serve to bear against layer 70 to further insure its immobility. In this position layer 70 is adapted to support a suitable hydrocolloid such as an alginate or other dental impression material. Such impression material is in common use and is initially heated when applied to an impression tray so that it is capable of flowing until properly tempered or cooled. Because of this, it has generally been the practice to separately take the impressions of the maxillary and mandibular portions with the result that considerable work is usually involved in arranging the separate impressions for a true centric occlusion. This problem is overcome with my new tray for as soon as the hydrocolloid is placed on layer 70 in section 12, the plates 66 and 68 are passed through slot 24 where they form a complete closure and retaining means for the impression material. These plates 66 and 68 are supported in slot 24 and engage a curved rib or flange 74 on wall 54 and are provided with small handles 76 to facilitate handling. A latch arrangement 78 (Figs. 3, 4 and 9) is used to hold plates against lateral movement and separation when in place as described. As soon as plates 66 and 68 are positioned, the entire tray is inverted so that the impression material can be placed in section 14. When this has been done the hydrocolloid is cooled or tempered as described until it reaches the proper consistency as is well known in the art and then the tray is righted and inserted into the oral cavity with plates 66 and 68 being of course removed. Thus the impression of both the upper and lower dental arches is made at the same time with the arches in their normal registering contacting position. Normally this should provide an impression of a true centric occlusion but experience has shown that the person on whom the impression is being taken is frequently over zealous in his desire to cooperate and thereby makes a deliberate effort to set his teeth in what he believes to be a normal registering position and this usually results in an unnatural protrusion of the lower jaw. To overcome this problem, the patient is instructed to place the tip of his tongue 80 (Fig. 5) on the ball or bead 64 and move it to and hold it at its rearward position. This causes a retrusion of the mandible and aligns the teeth in their true centric occlusion.

After my new tray is removed from the mouth, the impression material is processed in a routine manner and with my tray it can be mounted near ends 18 and 20 to a mechanical dental articulator. Then at the proper time, the tray can be removed leaving the full impression of both arches mounted on the articulator in their normal relationship.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my dental tray without departing from the real spirit and purpose of my invention, and it is my intention to cover by my claims, any modified forms of structure or use of mechanical equivalents which may be reasonably included within their scope.

I claim:

1. A dental tray for simultaneously taking the impression of both the entire upper and lower dental arches of the mouth to get a true centric occlusion, comprising, a pair of integral sections formed respectively in a U-shape to conform to the outline of the upper and lower dental arches, an upstanding buccal wall on one section and a downwardly extending buccal wall on the other, an arched lingual wall disposed within and spaced from the inner curved edge of said sections and suitably secured thereto, a reticulated member, means removably supporting said reticulated layer between said lingual wall and an intermediate point on said sections, a pair of complementary plates which together conform to the shape of the space between said lingual wall and said sections, and means removably supporting said plates to provide a cover or enclosure for said space.

2. A dental tray for simultaneously taking the impression of both the entire upper and lower dental arches of the mouth to get a true centric occlusion, comprising, a pair of integral sections formed respectively in a U-shape to conform to the outline of the upper and lower dental arches, an upstanding buccal wall on one section and a downwardly extending buccal wall on the other, an arched lingual wall disposed within and spaced from the inner curved edge of said sections and suitably secured thereto, said lingual wall provided with a slot, a rod disposed in said slot, a bead slidable on said rod, a reticulated member, means removably supporting said reticulated layer between said lingual wall and an intermediate point on said sections, a pair of complementary plates which together conform to the shape of the space between said lingual wall and said sections, and means removably supporting said plates to provide a cover or enclosure for said space.

3. A dental tray for simultaneously taking the impression of both the entire upper and lower dental arches of the mouth to get a true centric occlusion, comprising, a pair of integral hollow sections formed respectively in a U-shape to conform to the outline of the upper and lower dental arches, an upstanding buccal wall on one section and a downwardly extending buccal wall on the other, the hollow portions of said sections being interconnected, one of said sections provided with an inlet and one provided with an outlet, an arched lingual wall disposed within and spaced from the inner curved edge of said sections and suitably secured thereto, a reticulated member, means removably supporting said reticulated layer between said lingual wall and an intermediate point on said sections, a pair of complementary plates which together conform to the shape of the space between said lingual wall and said sections, and means removably supporting said plates to provide a cover or enclosure for said space.

4. A dental tray for simultaneously taking the impression of both the entire upper and lower dental arches of the mouth to get a true centric occlusion, comprising, a pair of integral sections formed respectively in a U-shape to conform to the outline of the upper and lower dental arches, an upstanding buccal wall on one section and a downwardly extending buccal wall on the other, an arched lingual wall disposed within and spaced from the inner curved edge of said sections and suitably secured thereto, a reticulated member, means removably supporting said reticulated layer between said lingual wall and an intermediate point on said sections, a pair of complementary plates which together conform to the shape of the space between said lingual wall and said sections, means removably supporting said plates to provide a cover or enclosure for said space, a flexible tube provided with spaced apertures detachably arranged about the contour of one of said sections, and said tube adapted for connection to a source of suction.

5. A dental tray for simultaneously taking the impression of both the entire upper and lower dental arches of the mouth to get a true centric occlusion, comprising, a pair of integral sections formed respectively in a U-shape to conform to the outline of the upper and lower dental arches, an upstanding buccal wall on one section and a downwardly extending buccal wall on the other, said sections separated and defined by a slot extending from near one end of its U-shape to a point near the other end, an arched lingual wall disposed within and spaced from the inner curved edge of said sections and suitably hingedly secured to the respective ends of said U-shape, means locking said lingual wall against a hinge movement at times, a reticulated member, means removably supporting said reticulated layer between said lingual wall and in said slot between said sections, a pair of complementary plates which together conform to the shape of the space between said lingual wall and said sections, and said plates slidable through said slot and engageable with said lingual wall to provide an enclosure for the space between said lingual wall and said sections.

6. A device as defined in claim 5 characterized by said sections being of hollow construction with said hollow areas interconnected, one of said sections having an inlet and the other an outlet.

7. A device as defined in claim 5 wherein said lingual wall is provided with a slot, a rod disposed in said slot, and a bead slidable on said rod.

8. A dental tray for simultaneously taking the impression of both the entire upper and lower dental arches of the mouth to get a true centric occlusion, comprising, a pair of integral sections formed respectively in a U-shape to conform to the outline of the upper and lower dental arches, an upstanding buccal wall on one section and a downwardly extending buccal wall on the other, an arched lingual wall disposed within the spaced from the inner curved edge of said sections and suitably secured thereto, said lingual wall provided with a slot, a rod disposed in said slot, a bead slidable on said rod, a reticulated member between said sections and said lingual wall, and a removable cover means between said sections and said lingual wall.

9. A dental tray for simultaneously taking the impression of both the entire upper and lower dental arches of the mouth to get a true centric occlusion, comprising, a pair of integral sections formed respectively in a U-shape to conform to the outline of the upper and lower dental arches, an upstanding buccal wall on one section and a downwardly extending buccal wall on the other, an arched lingual wall disposed within and spaced from the inner curved edge of said sections and suitably secured thereto, said lingual wall provided with a slot, a rod disposed in said slot, a bead slidable on said rod, a reticulated member between said sections and said lingual wall, a removable cover means between said sections and said lingual wall, a flexible tube provided with spaced apertures detachably arranged about the contour of one of said sections, and said tube adapted for connection to a source of suction.

10. In a dental tray for taking impressions of the dental arches of the type having a shape adapted to conform to the contour of the dental arch, an improved means for assuring a true centric occlusion comprising, an arched lingual wall disposed within the U-curve of said tray and suitably secured to said tray, said lingual wall provided with a slot extending in a direction from front to rear of the mouth, a rod disposed longitudinally of said slot, and a bead member slidable on said rod and designed to be contacted and moved by the tongue.

11. A dental tray for simultaneously taking the impression of both the entire upper and lower dental arches of the mouth to get a true centric occlusion, comprising, a pair of integral sections formed respectively in a U-shape to conform to the outline of the upper and lower dental arches, an upstanding buccal wall on one section and a downwardly extending buccal wall on the other, a U-shaped wall disposed within and spaced from the inner edge of said sections and suitably secured to the outer ends thereof, an arched lingual wall on said U-shaped wall and hingedly secured to the respective ends thereof, means for locking said lingual wall to the closed end of said U-shaped wall, a reticulated member between said sections and said U-shaped wall and designed to be clamped between said lingual wall and said U-shaped wall, and a removable cover means between said sections and said lingual wall.

12. A device as defined in claim 11 wherein said sections and said U-shaped wall are of hollow construction with the hollow portions interconnected, one section having an inlet and the other an outlet.

13. A device as defined in claim 11 wherein said lingual wall is provided with a slot, a rod disposed in said slot, and a bead slidable on said rod.

14. A dental tray for simultaneously taking the impression of both the entire upper and lower dental arches of the mouth to get a true centric occlusion, comprising, a pair of integral sections formed respectively in a U-shape to conform to the outline of the upper and lower dental arches, an upstanding buccal wall on one section to form an upper tray, a downwardly extending buccal wall on the other section to form a lower tray, a lingual wall disposed within the U-portion of said sections and suitably secured to said sections, said lingual wall provided with a slot, a rod disposed in said slot, a bead slidable on said rod, and a removable closure between said sections and said lingual wall.

15. A device as defined in claim 14 wherein said trays are of hollow construction with the hollow portions interconnected, one of said trays provided with an inlet and the other with an outlet.

References Cited in the file of this patent

UNITED STATES PATENTS 2,703,452    Getz _____ Mar. 8, 1955

FOREIGN PATENTS 321,475    Great Britain _____ Nov. 14, 1929